United States Patent [19]

Brown et al.

[11] Patent Number: 6,101,986
[45] Date of Patent: Aug. 15, 2000

[54] METHOD FOR A CONTROLLED TRANSITION BETWEEN OPERATING MODES OF A DUAL FUEL ENGINE

[75] Inventors: Scott C. Brown, Peoria, Ill.; Martin L. Willi, Lafayette, Ind.

[73] Assignee: Caterpillar Inc., Peoria, Ill.

[21] Appl. No.: 09/036,198

[22] Filed: Mar. 6, 1998

[51] Int. Cl.⁷ .................................................. F02M 21/02
[52] U.S. Cl. ...................................... 123/27 GE; 123/525
[58] Field of Search ............................... 123/27 GE, 535, 123/526

[56] References Cited

U.S. PATENT DOCUMENTS

| | | | |
|---|---|---|---|
| 3,577,877 | 5/1971 | Warne | 60/39.281 |
| 3,789,820 | 2/1974 | Douglas et al. | 123/27 GE |
| 4,463,734 | 8/1984 | Akeroyd | 123/525 |
| 4,517,928 | 5/1985 | Wolters | 123/27 GE |
| 4,597,364 | 7/1986 | Young | 123/27 GE |
| 4,641,625 | 2/1987 | Smith | 123/575 |
| 4,708,094 | 11/1987 | Helmich et al. | 123/27 GE |
| 4,955,326 | 9/1990 | Helmich | 123/27 GE |
| 5,136,986 | 8/1992 | Jensen | 123/27 GE |
| 5,140,959 | 8/1992 | Durbin | 123/585 |
| 5,150,685 | 9/1992 | Porter et al. | 123/478 |
| 5,224,457 | 7/1993 | Arsenault et al. | 123/526 |
| 5,226,396 | 7/1993 | Bailey | 123/494 |
| 5,355,854 | 10/1994 | Aubee | 123/431 |
| 5,370,097 | 12/1994 | Davis | 123/526 |
| 5,398,724 | 3/1995 | Vars et al. | 137/625.33 |
| 5,450,829 | 9/1995 | Beck | 123/435 |
| 5,526,786 | 6/1996 | Beck et al. | 123/357 |

FOREIGN PATENT DOCUMENTS 59185841  10/1984  European Pat. Off. ........ F02D 19/06

*Primary Examiner*—Marguerite McMahon
*Assistant Examiner*—Jason Benton
*Attorney, Agent, or Firm*—Haverstock Garrett & Roberts; R. Carl Wilbur

[57] ABSTRACT

A method for transitioning between a first operating mode of a dual fuel engine and a second operating mode of the dual fuel engine includes establishing a final liquid fuel amount desired to be delivered to the engine upon completion of the transition to the second operating mode. Delivery of liquid fuel to the engine is adjusted by a first amount and, correspondingly, delivery of gaseous fuel to the engine is adjusted by a second amount, where an energy content of the first amount of liquid fuel is substantially the same as an energy content of the second amount of gaseous fuel. A determination is made as to whether liquid fuel is being delivered to the engine in an amount which is substantially the same as the desired final liquid amount previously established. The fuel adjustment step and the determination step are repeated until a determination is made that liquid fuel is being delivered to the engine in an amount which is substantially the same as the desired final liquid fuel amount, at which point the transition is considered complete.

13 Claims, 3 Drawing Sheets

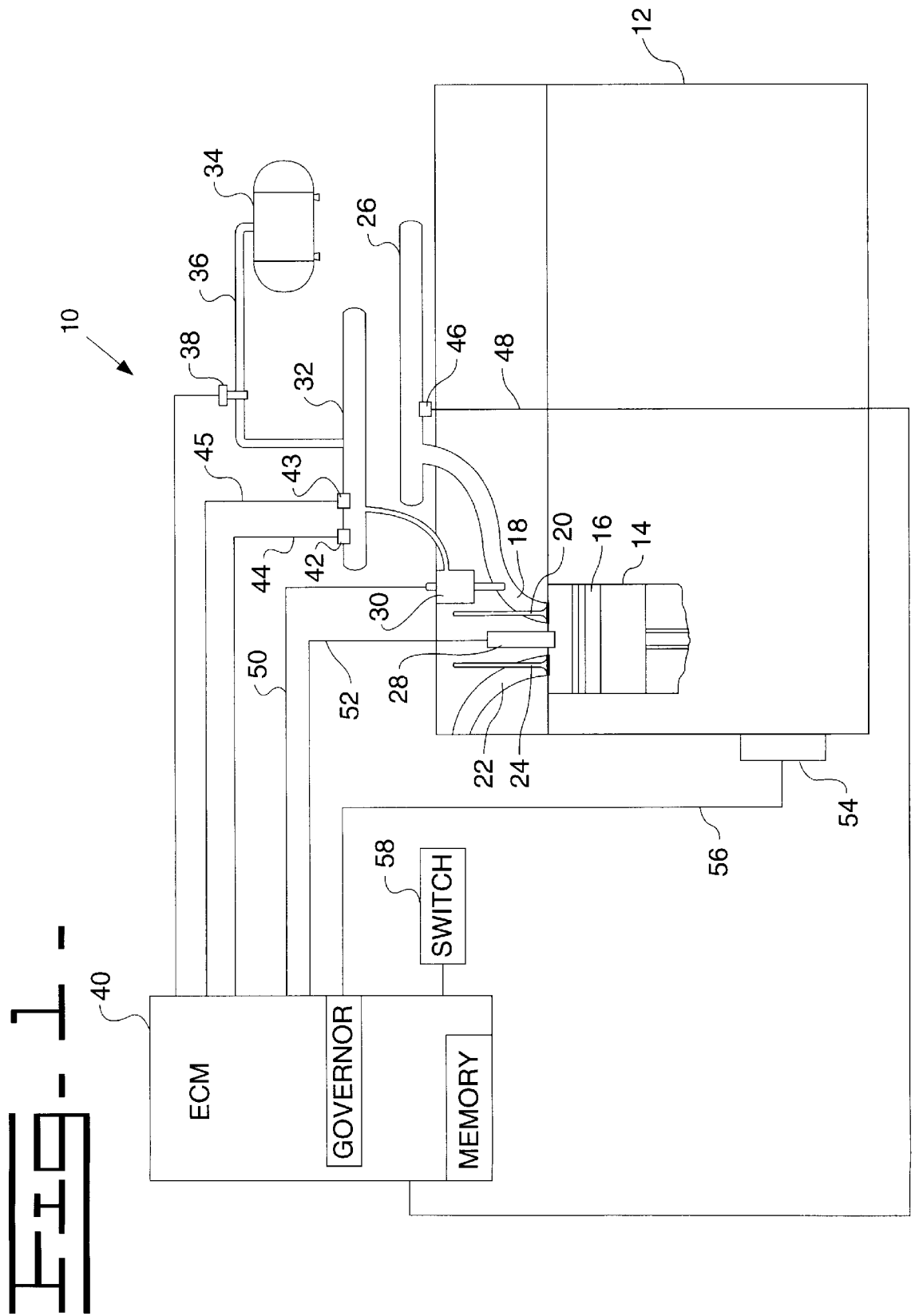

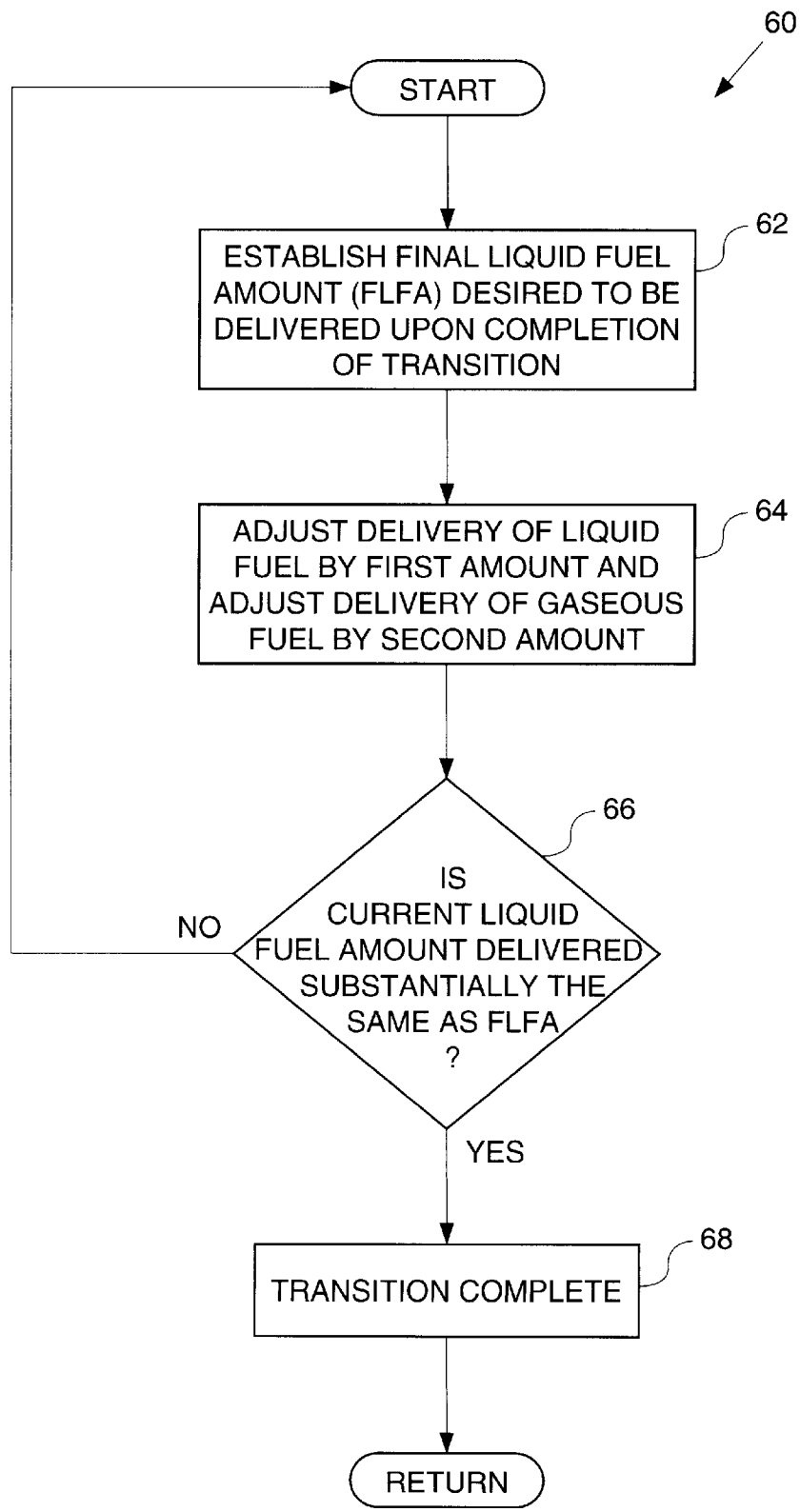

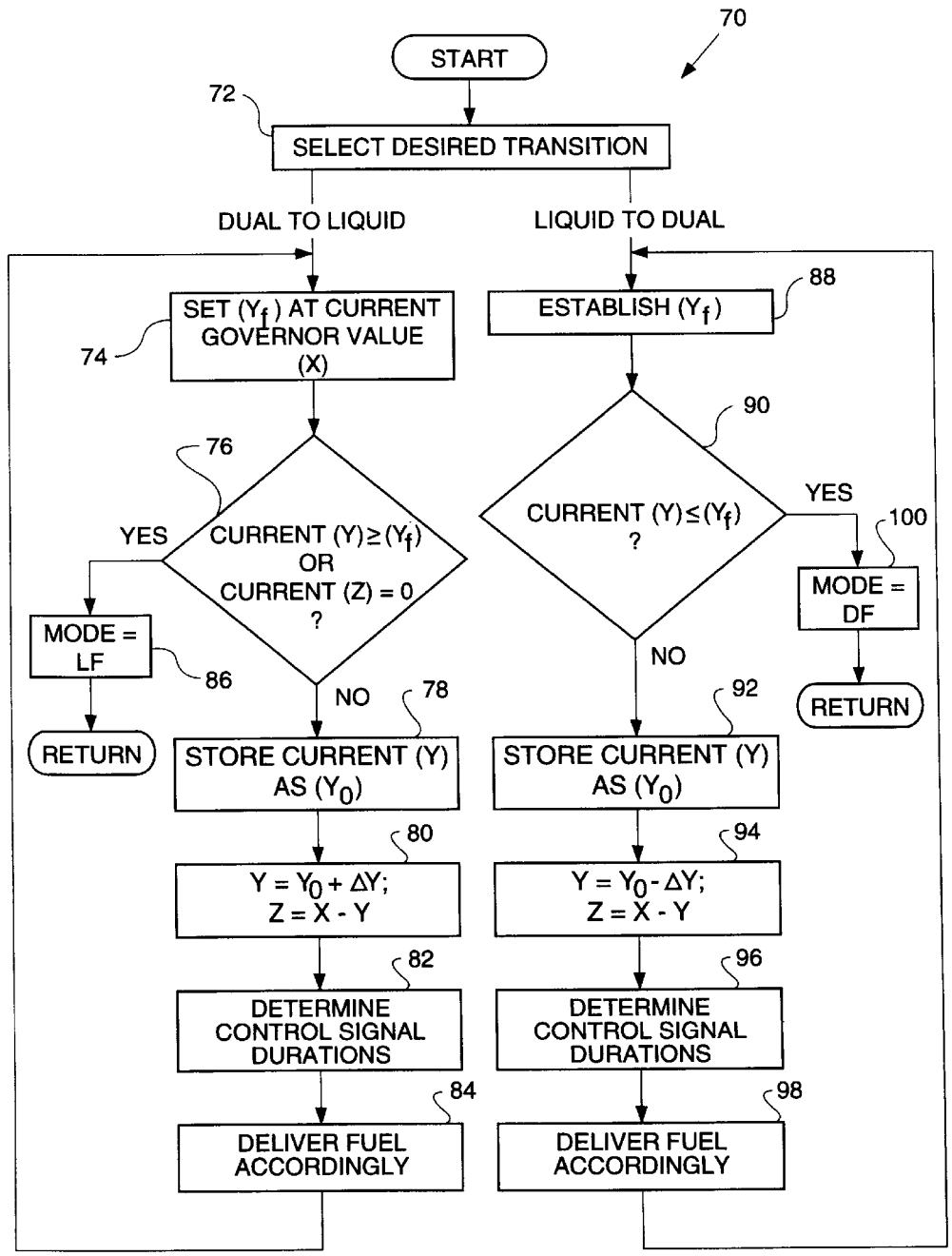

METHOD FOR A CONTROLLED TRANSITION BETWEEN OPERATING MODES OF A DUAL FUEL ENGINE

TECHNICAL FIELD

This invention relates generally to dual fuel engines capable of operating in both a liquid fuel mode and a dual fuel mode, and more particularly, to a method for transitioning between modes of operation in a dual fuel engine so as to reduce engine speed fluctuations which can be caused by such transitions.

BACKGROUND ART

A dual fuel engine can typically operate in two modes. In a strictly liquid fuel mode a liquid fuel, such as diesel fuel, is injected directly into an engine cylinder or a precombustion chamber as the sole source of energy during combustion. In a dual fuel mode a gaseous fuel, such as natural gas, is mixed with air in an intake port of a cylinder and a small amount or pilot amount of diesel fuel is injected into the cylinder or the precombustion chamber in order to ignite the mixture of air and gaseous fuel. In the past, the transition from a liquid fuel operating mode to a dual fuel operating mode, or from a dual fuel operating mode to a liquid fuel operating mode, could result in a series of undesired engine speed fluctuations such as engine speed surges and droops during such transitions.

Accordingly, the present invention is directed to overcoming one or more of the problems as set forth above.

DISCLOSURE OF THE INVENTION

In one aspect of the present invention a method for transitioning between a first operating mode of a dual fuel engine and a second operating mode of the dual fuel engine includes establishing a final liquid fuel amount desired to be delivered to the engine upon completion of the transition to the second operating mode. Delivery of liquid fuel to the engine is adjusted by a first amount and, correspondingly, delivery of gaseous fuel to the engine is adjusted by a second amount, where an energy content of the first amount of liquid fuel is substantially the same as an energy content of the second amount of gaseous fuel. A determination is made as to whether liquid fuel is being delivered to the engine in an amount which is substantially the same as the desired final liquid amount previously established. The fuel adjustment step and the determination step are repeated until a determination is made that liquid fuel is being delivered to the engine in an amount which is substantially the same as the desired final liquid fuel amount, at which point the transition is considered complete.

In another aspect of the present invention a method for transitioning between a first operating mode of a dual fuel engine and a second operating mode of the dual fuel engine, where the dual fuel engine includes at least one fuel injector for delivering liquid fuel to the engine and at least one gaseous fuel admission valve for delivering gaseous fuel to the engine is provided. The method includes providing a fuel control system which operates by (i) establishing a governor output value (X) indicative of a total fuel energy rate being delivered to the engine, a value (Y) indicative of a liquid fuel energy rate being delivered to the engine, and a value (Z) indicative of a gaseous fuel energy rate being delivered to the engine such that a sum of value (Y) and value (Z) is substantially equal to value (X); (ii) determining a fuel injector control signal duration as a function of value (Y); and (iii) determining a gaseous fuel admission valve control signal duration as a function of value (Z). A final liquid fuel energy rate indicative value desired to be delivered to the engine upon completion of the transition to the second operating mode is established. The liquid fuel energy rate indicative value (Y) is adjusted by a set amount and, correspondingly, the gaseous fuel energy rate indicative value (Z) is adjusted. A determination as to whether the adjusted liquid fuel energy rate indicative value is substantially the same as the desired final liquid fuel energy rate indicative value is made. The adjustment step and the determination step are repeated until a determination is made that the adjusted liquid fuel energy rate indicative value is substantially the same as the desired final liquid fuel energy rate indicative value.

BRIEF DESCRIPTION OF THE DRAWINGS

For a better understanding of the present invention, reference may be made to the accompanying drawings in which:

FIG. 1 is a schematic view of a dual fuel engine system in accordance with the present invention;

FIG. 2 is a flowchart of operating steps in accordance with the present invention; and FIG. 3 is a flowchart of operating steps for the dual fuel engine of FIG. 1 in accordance with the present invention.

BEST MODE FOR CARRYING OUT THE INVENTION

Referring to the drawings, numeral 10 in FIG. 1 depicts a dual fuel engine system including an engine 12 with a representative cylinder 14 shown. Although only one cylinder 14 is shown, it is recognized that number of cylinders of engine 12 could vary and that engine 12 could be of the in-line type, v-type, or even a rotary type engine. Piston 16 is positioned for displacement within cylinder 14, which cylinder 14 includes an intake port 18 and an exhaust port 20 including respective valves 22 and 24. Intake port 18 receives air from an air intake manifold 26 to which intake air travels after passing through, for example, an air filter (not shown) and turbocharger (not shown). Engine 12 includes a fuel injector 28, such as an electronic unit injector, positioned for injecting liquid fuel, such as diesel fuel, into cylinder 14. The liquid fuel may be provided to fuel injector 28 by means commonly known in the art. A gaseous fuel admission valve 30 is positioned between a gaseous fuel manifold 32 at an upstream side and intake port 18 at a downstream side, a nozzle portion of valve 30 extending into intake port 18 for delivering gaseous fuel thereto. Gaseous fuel admission valve 30 may, for example, be of the type shown and described in U.S. Pat. No. 5,398,724 available from Woodward Governor Company. Gaseous fuel manifold 32 is connected to a source of gaseous fuel 34 by fuel path 36, a solenoid operated gaseous fuel shut off valve 38 being positioned along fuel path 36. Although not shown, it is recognized that such a system might typically include a balance regulator positioned between gaseous fuel source 34 and gaseous fuel manifold 32 for regulating the gaseous fuel pressure at the upstream side of gaseous fuel admission valve 30.

An electronic control module (ECM) 40 is connected to a gaseous fuel pressure sensor 42 via conductive path 44 and to an intake air pressure sensor 46 via conductive path 48 for receiving pressure indicative signals from each of such sensors. Such pressure sensors are well known in the art and therefore a detailed description of the sensors is not included herein. A temperature sensor 43 is also provided in gaseous fuel manifold 32 to provide temperature indicative signals to ECM 40 via conductive path 45. ECM 40 is connected for controlling gaseous fuel admission valve 30 by conductive path 50 and is also connected for controlling fuel injector 28 by conductive path 52. In this regard it is know to include driver circuitry within ECM 40 for delivering current control signals to such devices. However, it is recognized that such driver circuitry could be formed separate from, but connected to, ECM 40. An engine speed sensor 54 associated with a camshaft of engine 12 is also connected to ECM 40 via conductive path 56 for delivering engine speed indicative signals thereto. ECM 40 typically includes processing means, such as a microcontroller or microprocessor, associated electronic circuitry such as input/output circuitry, as well as associated memory.

Dual fuel engine system 10 can operate in both a liquid fuel mode and a dual fuel mode. In the liquid fuel mode the liquid fuel is injected into engine cylinder 14 as the sole source of fuel energy during combustion. In a dual fuel mode the gaseous fuel is mixed with air in intake port 18 of cylinder 14 and a small amount or pilot amount of liquid fuel is injected into cylinder 14 in order to ignite the mixture of air and gaseous fuel.

Referring now to FIG. 2, a flowchart of operating steps in accordance with the present invention is shown. As indicated at step 62, a final liquid fuel amount desired to be delivered to the engine upon completion of a transition from a first operating mode to a second operating mode is established. The delivery of liquid fuel is adjusted by a first amount at step 64 and the delivery of gaseous fuel is correspondingly adjusted by a second amount. The adjustments are made such that if delivery of liquid fuel is decreased then delivery of gaseous fuel is increased, and if delivery of liquid fuel is increased then delivery of gaseous fuel is decreased. In either case the adjustment is further made such that an energy content of the first amount of liquid fuel is substantially the same as the energy content of the second amount of gaseous fuel. At step 66 a determination is then made as to whether the amount of liquid fuel being delivered is substantially the same as the desired final liquid fuel amount. Such determination can be made, for example, by determining whether a difference between the liquid fuel amount being delivered to the engine and the desired final liquid fuel amount established in step 62 is less than a predetermined difference. Alternatively, in the case of a transition from a liquid fuel mode to a dual fuel mode steps 62 and 64 could be repeated until in step 66 the liquid fuel amount being delivered to the engine is just equal to or less than the desired final liquid fuel amount established in step 62. In the case of a transition from a dual fuel mode to a liquid fuel mode steps 62 and 64 could be repeated until in step 66 the liquid fuel amount being delivered to the engine is just equal to or greater than the desired final liquid fuel amount established in step 62, or until the gaseous fuel amount being delivered to the engine falls to substantially zero.

With respect to adjustment step 64 it is recognized that the first amount could be a predetermined, stored amount such that the same adjustment is made with each repetition of step 64. On the other hand the first amount could be determined with each repetition of step 64 based upon then current engine operating parameters. For example, the first amount could be determined as a function of engine speed as sensed from speed sensor 54.

Industrial Applicability

The method of the present invention advantageously facilitates transition from one engine operating mode to another while maintaining a substantially constant total fuel energy rate delivery to the engine. In particular, as the liquid fuel energy rate delivered to the engine is increased/decreased the gaseous fuel energy rate delivered to the engine is correspondingly decreased/increased by substantially the same amount.

Dual fuel engine system 10 of FIG. 1 is particularly suited for operation in accordance with the transition method of the present invention. The fuel control system of engine 12 operates by establishing a governor output value (X) indicative of a total fuel energy rate to be delivered to the engine to maintain a desired engine speed. The desired engine speed may be a predetermined, stored engine speed or it may be indicated by a throttle setting for example. A first value (Y) indicative of a liquid pilot fuel energy rate to be delivered to the engine and a second value (z) indicative of a gaseous fuel energy rate to be delivered to the engine are each determined such that the sum of the liquid pilot fuel energy rate and the gaseous fuel energy rate is substantially equal to the total fuel energy rate. A fuel injector control signal duration and a gaseous fuel admission valve control signal duration are both determined such that the liquid fuel delivered to the engine provides the desired liquid pilot fuel energy rate and the gaseous fuel delivered to the engine provides the desired gaseous fuel energy rate. The gaseous fuel admission valve control signal duration corresponding to gaseous fuel value (Z) is determined by an appropriate calculation which takes into account the gaseous fuel pressure, the intake air pressure, a gaseous fuel manifold temperature, a stored gaseous fuel energy content value ($E_G$), and the known flow characteristics of gaseous fuel admission valve 30 in accordance with the following equation:

$$\text{GASDURATION}_Z = [(Z^* K_1^* E_L)/(N_I^* S^* E_G^* F_G)] + t_c,$$

where Z (mm) is a rack value, $K_1$ (g/mm*min) is a predetermined constant for converting rack to a liquid fuel flow rate, $E_L$ (J/g) is the energy content of the liquid fuel, $N_I$ (inj/rev) is the number of injections per engine revolution, S (rev/min) is the engine speed, $E_G$ (J/g) is the stored gaseous fuel energy content, $F_G$ (g/sec) is the flow rate of the gaseous fuel admission valve, and $t_c$ (sec) is an offset to account for mechanical delays and reduced flow for gaseous fuel admission valve 30 during valve opening and closing. With respect to liquid pilot value (Y) and gaseous fuel value (Z), value (Y) may be determined as a function of engine speed and engine load and value (Z) is defined as Z=X−Y. In the liquid fuel mode, Y=X and Z=0.

Reference is made to flowchart 70 of FIG. 3 which illustrates one implementation of the transition method of the present invention within dual fuel engine system 10. In particular, such steps may be implemented each time a transition from one mode to another is necessary. At step 72 the desired transition is selected. If the transition is from a dual fuel mode to a liquid fuel mode, at step 74 a final liquid fuel energy rate indicative value ($Y_f$) desired upon completion of the transition is set to the current governor output value (X). The current value (Y) is then compared to desired final value ($Y_f$) to determine if the current value (Y) is substantially the same as desired final value ($Y_f$), such as by determining if the current value (Y) is greater than or equal to desired final value ($Y_f$) or by determining if the current value (Z) is substantially zero. If not, at step 78 the current liquid fuel value (Y) is stored as value ($Y_0$) and at step 80 value (Y) is increased by $\Delta Y$. Gaseous fuel value (Z) is correspondingly decreased because the relationship X=Y+Z is maintained. Appropriate control signal durations corresponding to the adjusted value (Y) and adjusted value (Z) are determined at step 82 and fuel is delivered accordingly at step 84. Steps 74, 76, 78, 80, 82, and 84 are repeated until a determination is made at step 76 that the current value (Y) is substantially the same as value ($Y_f$) at which point the transition is complete and a mode indicator may be set to liquid fuel at step 86.

If the transition is from a liquid fuel mode to a dual fuel mode, then a final liquid fuel energy rate indicative value ($Y_f$) desired upon completion of the transition is established at step 88. Desired final value ($Y_f$) may be established as a function of the current engine speed and engine load as described above. At step 90 the current value (Y) is compared with desired final value ($Y_f$) to determine if they are substantially the same, such as by determining if the current value (Y) is less than or equal to the desired final value ($Y_f$). If not, at step 92 the current liquid fuel value (Y) is stored as value ($Y_0$) and at step 94 value (Y) is decreased by $\Delta Y$. Gaseous fuel value (Z) is correspondingly increased because the relationship X=Y+Z is maintained. Appropriate control signal durations corresponding to the adjusted value (Y) and adjusted value (Z) are determined at step 96 and fuel is delivered accordingly at step 98. Steps 88, 90, 92, 94, 96, and 98 are repeated until a determination is made at step 76 that the current value (Y) is substantially the same as value ($Y_f$) at which point the transition is complete and a mode indicator may be set to dual fuel at step 100.

Because the amount of liquid and gaseous fuel delivered to the engine varies as liquid fuel value (Y) and gaseous fuel value (Z) vary, adjusting such values in steps 80 and 94 results in the desired adjustment in delivery of such fuels to the engine. In terms of the $\Delta Y$ adjustments made in steps 80 and 94 it is recognized that the $\Delta Y$ value could be a predetermined, stored value such that the same adjustment is made each time the steps are repeated. Alternatively, the adjustment factor $\Delta Y$ could be a value which is calculated or determined from a map each time such steps are repeated. For example, $\Delta Y$ could be determined as a function of any change which might occur in governor output value (X) so that $\Delta Y$ is maintained at a level to prevent undesired engine speed fluctuations.

In terms of the stored energy content value ($E_G$), it is recognized that such value could be an energy per unit mass such as (J/g) or such value could be an energy per unit volume such as (J/m$^3$). Such stored value can be adjusted as necessary to account for variations in the energy content of the gaseous fuel. It is also anticipated that steps in accordance with the present invention could be incorporated into the processing means of ECM 40, or other like controller, using a variety of known programming techniques. Further, it is recognized that steps in accordance with the present invention could be performed in a manner which results in a desired transition time.

Other aspects, objects and advantages of the present invention can be obtained from a study of the drawings, the disclosure and the appended claims

What is claimed is:

1. A method for transitioning between a first operating mode of a dual fuel engine and a second operating mode of the dual fuel engine, the method comprising the steps of:
   (a) establishing a final liquid fuel amount desired to be delivered to the engine upon completion of the transition to the second operating mode;
   (b) adjusting delivery of liquid fuel to the engine by a first amount and correspondingly adjusting delivery of gaseous fuel delivered to the engine by a second amount, an energy content of the first amount of liquid fuel being substantially the same as an energy content of the second amount of gaseous fuel;
   (c) determining whether liquid fuel is being delivered to the engine in an amount which is substantially the same as the amount established in step (a);
   (d) repeating steps (b) and (c) until a determination is made in step (c) that liquid fuel is being delivered to the engine in an amount which is substantially the same as the liquid fuel amount established in step (a);
   wherein the first operating mode is a liquid fuel mode and the second operating mode is a dual fuel mode;
   wherein step (b) includes decreasing delivery of liquid fuel to the engine in the first amount and increasing delivery of gaseous fuel to the engine in the second amount; and
   wherein step (c) includes determining whether the liquid fuel amount being delivered to the engine is less than the liquid fuel amount established in step (a).

2. A method for transitioning between a first operating mode of a dual fuel engine and a second operating mode of the dual fuel engine, the method comprising the steps of:
   (a) establishing a final liquid fuel amount desired to be delivered to the engine upon completion of the transition to the second operating mode;
   (b) adjusting delivery of liquid fuel to the engine by a first amount and correspondingly adjusting delivery of gaseous fuel delivered to the engine by a second amount, an energy content of the first amount of liquid fuel being substantially the same as an energy content of the second amount of gaseous fuel;
   (c) determining whether liquid fuel is being delivered to the engine in an amount which is substantially the same as the amount established in step (a);
   (d) repeating steps (b) and (c) until a determination is made in step (c) that liquid fuel is being delivered to the engine in an amount which is substantially the same as the liquid fuel amount established in step (a);
   wherein the first operating mode is a dual fuel mode and the second operating mode is a liquid fuel mode;
   wherein step (b) includes increasing delivery of liquid fuel to the engine by the first amount and decreasing delivery of gaseous fuel to the engine by the second amount; and
   wherein step (c) includes determining whether the liquid fuel amount being delivered to the engine is greater than the liquid fuel amount established in step (a).

3. A method for transitioning between a first operating mode of a dual fuel engine and a second operating mode of the dual fuel engine, the method comprising the steps of:
   (a) establishing a final liquid fuel amount desired to be delivered to the engine upon completion of the transition to the second operating mode;
   (b) adjusting delivery of liquid fuel to the engine by a first amount and correspondingly adjusting delivery of gaseous fuel delivered to the engine by a second amount, an energy content of the first amount of liquid fuel being substantially the same as an energy content of the second amount of gaseous fuel, wherein at least one fuel injector is used to deliver liquid fuel to the engine and at least one gaseous fuel admission valve is used to deliver gaseous fuel to the engine;
   (c) determining whether liquid fuel is being delivered to the engine in an amount which is substantially the same as the amount established in step (a);
   (d) repeating steps (b) and (c) until a determination is made in step (c) that liquid fuel is being delivered to the engine in an amount which is substantially the same as the liquid fuel amount established in step (a);

(e) sensing an actual engine speed;

(f) establishing a governor output value (X) indicative of a total fuel energy rate being delivered to the engine;

(g) establishing a value (Y) indicative of a liquid fuel energy rate being delivered to the engine and determining a fuel injector control signal duration as a function of value (Y);

(h) establishing a value (Z) indicative of a gaseous fuel energy rate being delivered to the engine and determining a gaseous fuel admission valve control signal duration as a function of value (Z); and wherein steps (g) and (h) are performed such that a sum of value (Y) and value (Z) is substantially equal to governor output value (X).

4. The method, as set forth in claim 3, wherein:

steps (e), (f), (g), and (h) are performed each time steps (b) and (c) are repeated.

5. A method for transitioning between a first operating mode of a dual fuel engine and a second operating mode of the dual fuel engine, the dual fuel engine including at least one fuel injector for delivering liquid fuel to the engine and at least one gaseous fuel admission valve for delivering gaseous fuel to the engine, the method comprising the steps of:

(a) providing a fuel control system which operates in accordance with the following steps:

(i) establishing a governor output value (X) indicative of a total fuel energy rate being delivered to the engine, a value (Y) indicative of a liquid fuel energy rate being delivered to the engine, and a value (Z) indicative of a gaseous fuel energy rate being delivered to the engine such that a sum of value (Y) and value (Z) is substantially equal to value (X);

(ii) determining a fuel injector control signal duration as a function of value (Y);

(iii) determining a gaseous fuel admission valve control signal duration as a function of value (Z);

(b) establishing a final liquid fuel energy rate indicative value desired to be delivered to the engine upon completion of the transition to the second operating mode;

(c) adjusting the liquid fuel energy rate indicative value (Y) by a set amount and correspondingly adjusting the gaseous fuel energy rate indicative value (Z);

(d) determining whether the adjusted liquid fuel energy rate indicative value of step (c) is substantially the same as the final liquid fuel energy rate indicative value of step (b);and (e) repeating steps (c) and (d) until a determination is made in step (d) that the adjusted liquid fuel energy rate indicative value of step (c) is substantially the same as the final liquid fuel energy rate indicative value of step (b).

6. The method, as set forth in claim 5, wherein step (b) is repeated each time steps (c) and (d) are repeated.

7. The method, as set forth in claim 5, wherein the set amount of step (c) is the same for each repetition of step (c).

8. The method, as set forth in claim 5, wherein step (d) includes determining whether a difference between the adjusted liquid fuel energy rate indicative value of step (c) and the final liquid fuel energy rate indicative value of step (b) is less than a predetermined difference.

9. The method, as set forth in claim 5, wherein the first operating mode is a liquid fuel mode and the second operating mode is a dual fuel mode, and wherein:

step (c) includes decreasing the liquid fuel energy rate indicative value (Y) by the set amount and increasing the gaseous fuel energy rate indicative value (Z) by the set amount.

10. The method, as set forth in claim 9, wherein step (d) includes determining whether the adjusted liquid fuel energy rate indicative value of step (c) is less than the final liquid fuel energy rate indicative value of step (b).

11. The method, as set forth in claim 5, wherein the first operating mode is a dual fuel mode and the second operating mode is a liquid fuel mode, and wherein:

step (c) includes increasing the liquid fuel energy rate indicative value (Y) by the set amount and increasing the gaseous fuel energy rate indicative value (Z) by the set amount.

12. The method, as set forth in claim 11, wherein step (d) includes determining whether the adjusted liquid fuel energy rate indicative value of step (c) is greater than the final liquid fuel energy rate indicative value of step (b).

13. The method, as set forth in claim 11, wherein step (b) includes determining whether the adjusted gaseous fuel energy rate indicative value is substantially zero.

* * * * *